United States Patent
Tanimoto et al.

(10) Patent No.: US 12,381,444 B2
(45) Date of Patent: Aug. 5, 2025

(54) HOLLOW DISC ROTOR FOR FLYWHEEL POWER STORAGE DEVICE AND METHOD FOR MANUFACTURING SAME

(71) Applicant: NexFi Technology Inc., Suita (JP)

(72) Inventors: Satoshi Tanimoto, Suita (JP); Takashi Nakamura, Suita (JP)

(73) Assignee: NexFi Technology Inc., Osaka (JP)

( * ) Notice: Subject to any disclaimer, the term of this patent is extended or adjusted under 35 U.S.C. 154(b) by 0 days.

(21) Appl. No.: 18/700,509

(22) PCT Filed: Dec. 6, 2022

(86) PCT No.: PCT/JP2022/044848
§ 371 (c)(1),
(2) Date: Apr. 11, 2024

(87) PCT Pub. No.: WO2023/120151
PCT Pub. Date: Jun. 29, 2023

(65) Prior Publication Data
US 2024/0429780 A1    Dec. 26, 2024

(30) Foreign Application Priority Data

Dec. 20, 2021 (JP) .................................. 2021-205675

(51) Int. Cl.
*H02K 7/02* (2006.01)
*F03G 3/08* (2006.01)
(Continued)

(52) U.S. Cl.
CPC .............. *H02K 7/025* (2013.01); *F03G 3/08* (2013.01); *F16F 15/30* (2013.01); *H02J 15/007* (2020.01); *Y02E 60/16* (2013.01)

(58) Field of Classification Search
CPC . H02K 7/02; H02K 7/025; H02J 15/00; H02J 15/007; F03G 3/08; F16C 15/00; Y02E 60/16; F16F 15/30; F16F 15/305
See application file for complete search history.

(56) References Cited

U.S. PATENT DOCUMENTS

| 3,602,066 A | * | 8/1971 | Wetherbee, Jr. | ...... F16F 15/305 74/572.21 |
| 3,602,067 A | * | 8/1971 | Wetherbee, Jr. | ...... F16F 15/305 74/572.21 |

(Continued)

FOREIGN PATENT DOCUMENTS

| CN | 201523280 U | * | 7/2010 |
| CN | 101800450 A | * | 8/2010 |

(Continued)

OTHER PUBLICATIONS

Yoshimura et al., "Development of High Speed Rotation Disk made of Carbon Fiber Reinforced Three-Dimensional Composites", The Japan Society of Mechanical Engineers, the 18th Lecture Meeting of Machine Materials and Materials and Processing (M&P 2010), CD-ROM of Collection of Papers, No. 10-29.

(Continued)

*Primary Examiner* — Adam D Rogers
(74) *Attorney, Agent, or Firm* — Carrier, Shende & Associates P.C.; Joseph P. Carrier; Jeffrey T. Gedeon

(57) ABSTRACT

Provided are a hollow disk rotor for a flywheel energy storage system with a significantly improved circumferential velocity limit and stored energy limit, and a method for manufacturing the same. The rotor includes a plurality of circumferentially wound reinforcement fibers, a matrix material that fills gaps between the reinforcement fibers, and carbon nanotubes extending upward through the matrix material from surfaces of the reinforcement fibers as base points.

14 Claims, 7 Drawing Sheets

(51) Int. Cl.
*F16F 15/30* (2006.01)
*H02J 15/00* (2006.01)

(56) References Cited

U.S. PATENT DOCUMENTS

| | | | | |
|---|---|---|---|---|
| 5,387,451 | A * | 2/1995 | Miller | F16F 15/30 |
| | | | | 428/116 |
| 8,168,291 | B2 * | 5/2012 | Shah | C04B 35/185 |
| | | | | 428/293.1 |
| 8,776,635 | B2 * | 7/2014 | Morgan | F16F 15/30 |
| | | | | 156/60 |
| 11,958,948 | B2 * | 4/2024 | Komukai | H02K 1/2706 |
| 12,119,730 | B2 * | 10/2024 | Tanimoto | F03G 3/08 |
| 12,142,915 | B2 * | 11/2024 | Nakamura | H02K 7/025 |
| 2012/0060644 | A1 | 3/2012 | Morgen et al. | |

FOREIGN PATENT DOCUMENTS

| | | | | |
|---|---|---|---|---|
| CN | 201656663 U | * | 11/2010 | |
| DE | 102016112753 A1 | * | 1/2018 | F03G 3/08 |
| JP | 2000-081091 A | | 3/2000 | |
| JP | 5239058 B2 | | 7/2013 | |
| JP | 2013-539843 A | | 10/2013 | |
| JP | 2015110303 A | * | 6/2015 | |
| WO | WO-2023085098 A1 | * | 5/2023 | |

OTHER PUBLICATIONS

Hiroshima et al., "Spin test of three-dimensional composite rotor for flywheel energy storage system", Composite Structures 136 (2016) pp. 626-634.

* cited by examiner

6 FOLD SYMMETRIC ARRANGEMENT

D: DIAMETER OF EACH CF
L: LINE-TO-LINE DISTANCE
$\ell$: SEPARATION DISTANCE
$L = \ell + D$ $\frac{1}{2}(\sqrt{2}\ell + (\sqrt{2}-1)D)$

4 FOLD SYMMETRIC ARRANGEMENT

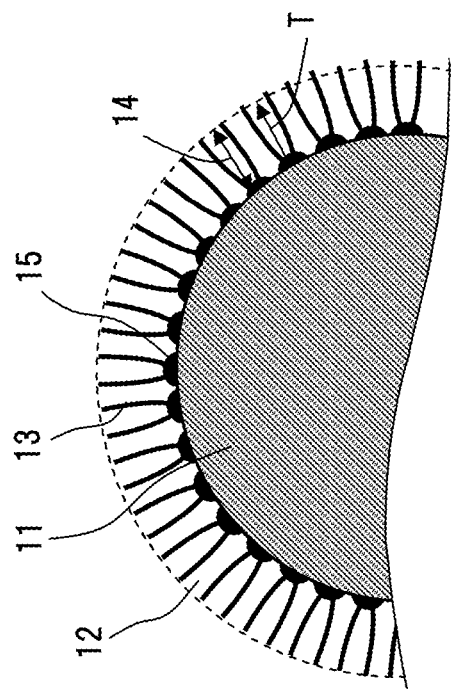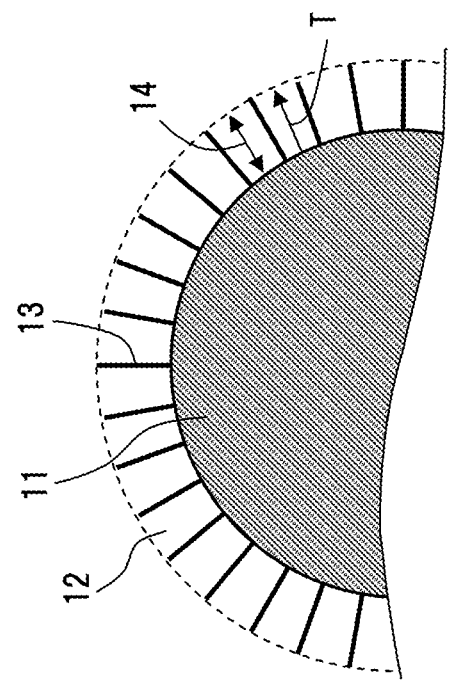

FIG. 5

| ROTATIONAL PERFORMANCE OF ROTOR | SIMPLE CIRCUMFERENTIALLY WOUND CFRP ROTOR (FIRST CONVENTIONAL TECHNOLOGY) | CNT-CFRP ROTOR (TECHNOLOGY OF THE PRESENT INVENTION) |
|---|---|---|
| PERIPHERAL SPEED LIMIT (m/s) | 750 | 2,200 |
| CIRCUMFERENTIAL VELOCITY LIMIT (rpm) | 47,000 | 141,000 |
| STORED ENERGY LIMIT (kWh) | 4.5 | 40 |
| DENSITY OF STORED ENERGY AT LIMIT LEVEL (Wh/kg) | 40 | 355 |
| BREAKING MODE | RADIAL YIELD | CIRCUMFERENTIAL YIELD |

FIG. 7

| ROTATIONAL PERFORMANCE | | FIRST CONVENTIONAL TECHNOLOGY | TECHNOLOGY OF THE PRESENT INVENTION |
|---|---|---|---|
| ROTOR<br>b=0.15m<br>a=0.03m<br>h=1m | CIRCUMFERENTIAL VELOCITY LIMIT (m/s) | 750 | 2,200 |
| | ROTATIONAL SPEED LIMIT (rpm) | 47,000 | 141,000 |
| | STORED ENERGY LIMIT (kWh) | 4.5 | 40 |
| | DENSITY OF STORED ENERGY AT LIMIT LEVEL (Wh/kg) | 40.1 | 355 |
| | BREAKING MODE | RADIAL YIELD | CIRCUMFERENTIAL YIELD |
| HUB<br>RADIAL 0.03m<br>h=1m | CIRCUMFERENTIAL VELOCITY LIMIT (m/s) | 22,000 | |
| | ROTATIONAL SPEED LIMIT (rpm) | 210,000 | |
| | STORED ENERGY LIMIT (kWh) | 0.24 | |
| | DENSITY OF STORED ENERGY AT LIMIT LEVEL (Wh/kg) | 30.4 | |
| | BREAKING MODE | RADIAL AND CIRCUMFERENTIAL YIELDS AT THE SAME TIME | |
| FLYWHEEL | CIRCUMFERENTIAL VELOCITY LIMIT (m/s) | 750 | 2,200 |
| | ROTATIONAL SPEED LIMIT (rpm) | 47,000 | 141,000 |
| | STORED ENERGY LIMIT (kWh) | 4.5 | 40 |
| | DENSITY OF STORED ENERGY AT LIMIT LEVEL (Wh/kg) | 38 | 332 |
| | BREAKING MODE | RADIAL YIELD | CIRCUMFERENTIAL YIELD |

HOLLOW DISC ROTOR FOR FLYWHEEL POWER STORAGE DEVICE AND METHOD FOR MANUFACTURING SAME

TECHNICAL FIELD

The present invention relates to a technology for improving the peripheral speed limit and the stored energy limit of a hollow disk (including cylindrical) rotor, which is the main component of a flywheel of a flywheel power storage device (energy storage system), in particular, a "hollow disk rotor reinforced with circumferentially wound fibers". Typical examples of such a rotor include, but are not limited to, a "carbon fiber reinforced plastics (CFRP)" rotor obtained by winding high-strength carbon fibers in the circumferential direction, and then impregnating the gaps between the fibers with a matrix material, such as epoxy resin, followed by solidification.

The reinforcement fibers may be any of boron fibers, glass fibers, aramid fibers, alumina fibers, silicon carbide fibers, and various metal fibers in accordance with the intended use. In addition, the matrix material may be various types of resin including epoxy resin.

Hereinafter, the "CFRP hollow disk (or cylindrical) rotor" may be abbreviated as a "CFRP rotor" or simply a "rotor", while the "flywheel" may be abbreviated as "FW".

BACKGROUND ART

A flywheel energy storage system is an energy storage system with functions of storing external energy in a FW rotor as rotational kinetic energy and feeding the rotational kinetic energy stored in the FW rotor to an external system as electrical energy via a means of performing interconversion of electrical energy and rotational kinetic energy.

The flywheel energy storage system has excellent features such that (I) it functions stably both in the low-temperature environment and the high-temperature environment, (II) it hardly undergoes degradation in characteristics or life even after it is repeatedly charged and discharged or is left in a fully charged state, (III) its correct amount of charge can be easily detected, (IV) its input/output power density can be freely designed, and (V) it has far lower internal resistance than secondary batteries.

Typically, when a hollow disk, such as a FW rotor, is rotated, tensile stress that is stronger in the circumferential direction than in the radial direction is generated. Provided that the inner radius and the outer radius of the hollow disk are respectively represented by a and b, the maximum tensile stress in the circumferential direction (hereinafter simply referred to as "circumferential stress") of the hollow disk tends to become greater and the maximum tensile stress in the radial direction (hereinafter simply referred to as "radius stress") tends to become smaller as the ratio of the inner radius to the outer radius $\lambda=a/b$ (where $0<\lambda<1$) is higher (i.e., is closer to 1). There is even a case where the maximum value of the circumferential stress becomes two orders of magnitude higher than the maximum value of the radius stress. Note that the maximum value of the circumferential stress and the maximum value of the radius stress occur with different radii r.

In recent years, there has been active development of "circumferentially wound fiber-reinforced plastics (circumferentially wound CFRP)" FW rotors formed by winding high-strength fibers, such as carbon fibers, in the circumferential direction, and then impregnating the gaps between the fibers with plastic (as a matrix material), replacing conventional FW rotors made of bulk metal. This is because rotors with such a configuration have extremely high tensile yield strength in the circumferential direction.

However, such a simple circumferentially wound CFRP rotor (i.e., first conventional technology) has a problem in that the circumferential velocity limit or the stored energy limit cannot be obtained in practice at an expected level (each of the "peripheral speed limit" and the "stored energy limit" as referred to herein is the base quantity for evaluating (comparing) the energy storage performance of the rotor. Specifically, the circumferential velocity limit is the circumferential velocity that is reached immediately before the rotor, which is increasing its rotational speed, breaks down, and the stored energy limit is the maximum rotational kinetic energy that the rotor has been able to store immediately before the rotor breaks down. Needless to say, the higher the limit, the higher the performance).

The reason for this is briefly described below. Typically, the stored energy limit of a rotary disk changes in proportion to $(1-\lambda^4)$. Thus, to increase the stored energy limit, it seems to be necessary to form a rotor having the ratio $\lambda$ of the inner radius to the outer radius that is as low as possible (i.e., close to 0). However, if the ratio $\lambda$ of the inner radius to the outer radius is reduced in response to such demand, the proportion of the maximum tensile stress in the radial direction when the rotor is rotated would increase abruptly. This leads to an uncomfortable situation in which, in the simple circumferentially wound FRP rotor, a tensile yield in the radial direction (hereinafter, a radial yield) occurs first at a rotational speed that is far lower than the rotational speed at which a tensile yield in the circumferential direction (hereinafter, a circumferential yield) would occur.

The reason that a radial yield occurs first is that the radial direction is not reinforced with the fibers at all in the simple circumferentially wound CFRP rotor. Consequently, the radial yield strength becomes significantly lower than the circumferential yield strength.

To solve the problem of such a simple circumferentially wound CFRP rotor, Patent Literature 1 below proposes a 3D fabric CFRP rotor reinforced with "three-dimensional fabric carbon fiber skeletons" characterized in that reinforcement fibers woven with a weaving process are arranged not only in the circumferential direction but also in the radial direction and the direction of the rotating shaft, and the thickness of the disk is reduced in a direction from the center to the outer periphery so as to achieve a constant fiber volume rate in the radial direction (see FIGS. 1 and 3 of Patent Literature 1).

However, when a 3D fabric CFRP rotor (i.e., second conventional technology) was actually produced and a rotational test was conducted thereon, it has been reported that shaft vibration of the rotor has increased with an increase in circumferential velocity, and the rotor has eventually broken down at a circumferential velocity (around 530 m/s) far lower than the desired circumferential velocity limit, which is problematic (Non Patent Literature 1).

When a 3D fabric CFRP rotor is produced by forming a carbon fiber skeleton structure through a weaving process with an attribute that cannot achieve precision finishing, mass imbalance unavoidably occurs. Note that such imbalance includes both eccentricity where the center of gravity of the rotor deviates from the center of rotation, that is, static imbalance, and dynamic imbalance that occurs as the carbon fiber skeleton structure is distorted non-uniformly due to rotational stress.

To solve the foregoing problem of the shaft vibration, continuous improvements (see Non Patent Literature 2) have been pursued. However, a 3D fabric CFRP rotor with a circumferential velocity of greater than 800 m/s has not been obtained so far.

CITATION LIST

Patent Literature

Patent Literature 1: Japanese Patent No. 5239058

Non Patent Literature

Non Patent Literature 1: Junichi Yoshimura, Noboru Hiroshima, Hiroshi Hatta, Ken Goto, and Yasuo Kogo, "Development of High Speed Rotation Disk made of Carbon Fiber Reinforced Three-Dimensional Composites", The Japan Society of Mechanical Engineers, the 18th Lecture Meeting of Machine Materials and Materials and Processing (M&P 2010). CD-ROM of Collection of Papers, No. 10-29

Non Patent Literature 2: N. Hiroshima, H. Hatta, M. Koyama, J. Yoshimura, Y. Nagura, K. Goto, Y. Kogo "Spin test of three-dimensional composite rotor for flywheel energy storage system" Composite Structures 136 (2016) pp. 626-634

SUMMARY OF INVENTION

Technical Problem

As described above, the conventional simple circumferentially wound CFRP rotor has a fatal drawback in its low radial yield strength, while the conventional 3D fabric CFRP rotor has a serious drawback in that it cannot obtain precise rotational balance characteristics. Thus, both the CFRP rotors have a problem in that they cannot achieve a high circumferential velocity limit or a high stored energy limit that is potentially expected.

In view of the foregoing problems, an object of the invention of the present application is to provide a hollow disk rotor for a flywheel energy storage system that has a significantly improved circumferential velocity limit and stored energy limit, and a method for manufacturing such a rotor.

Solution to Problem

The inventors of the present application have focused on the fact that the problem of the shaft vibration resulting from the imbalance associated with the 3D fabric CFRP rotor has not been reported for the simple circumferentially wound CFRP rotor, and considered if there is any effective configuration or method for increasing the radial yield strength while maintaining the basic configuration of the simple circumferentially wound CFRP rotor. Then, the inventors have arrived at a method for increasing the radial yield strength of a simple circumferentially wound CFRP rotor by reinforcing it with carbon nanotubes (hereinafter abbreviated as CNTs in some cases) arranged in a direction perpendicular to the reinforcement fibers, and have conducted concentrated studies thereon. Consequently, the inventors have succeeded in implementing a CNT-CFRP rotor that can achieve a circumferential velocity limit and a stored energy limit, both of which are significantly higher than those of the conventional rotors.

CNTs are widely known as materials that are highly flexible and exhibit extremely high tensile strength in the direction of their growth axes. In the present invention, CNTs are incorporated in a skillful way so that such properties are significantly exhibited in the radial direction of a rotor.

A first aspect of the invention is directed to a hollow disk rotor (i.e., a CNT-FRP rotor) of a flywheel for a flywheel energy storage system, including a plurality of circumferentially wound reinforcement fibers (FRs); a matrix material (P) that fills gaps between the reinforcement fibers; and carbon nanotubes (CNTs) extending upward through the matrix material from surfaces of the reinforcement fibers as base points.

A second aspect of the invention is directed to the hollow disk rotor according to the first aspect of the invention, in which provided that a mean separation distance between monofilaments of a pair of nearest neighbor reinforcement fibers is represented by l, a mean diameter of the monofilaments is represented by D, and a mean extension distance of the carbon nanotubes extending upward is represented by T, T, l, and D at least have the following relationship:

$$T \geq \frac{l}{2}, \qquad \text{[Math. 1]}$$

or desirably the following relationship:

[Math 2]

$$T \geq \frac{1}{2}((\sqrt{2}-1)D + \sqrt{2}l)$$

A third aspect of the invention is directed to the hollow disk rotor according to the first aspect of the invention, in which each of the base points on the surfaces of the reinforcement fibers has one of a graftage configuration that allows one end surface of each carbon nanotube to be fixed to the surface, or a point fixation configuration that allows a side surface of each carbon nanotube to be bonded to the surface at one point.

A fourth aspect of the invention is directed to the hollow disk rotor according to the third aspect of the invention, in which a relationship between a mean length dimension u and a mean extension distance T of the carbon nanotubes is as follows for the graftage configuration:

[Math 3]

$$u \geq T,$$

and is as follows for the point fixation configuration:

[Math 3]

$$u \geq 2T.$$

A fifth aspect of the invention is directed to the hollow disk rotor according to the first aspect of the invention, in which a mean volume fraction $V_F$ of the reinforcement fibers is at least 0.5 (50%), or preferably, greater than or equal to 0.6 (60%).

A sixth aspect of the invention is directed to the hollow disk rotor according to the first aspect of the invention, in which the reinforcement fibers include one type of fiber selected from among carbon fibers, boron fibers, glass fibers, aramid fibers, alumina fibers, silicon carbide fibers, and various metal fibers, or composite fibers including two or more types of the foregoing fibers.

A seventh aspect of the invention is directed to the hollow disk rotor according to the sixth aspect of the invention, in which a mean value of diameters of the reinforcement fibers is in a range of at least 3 μm to 9 μm, and variation of the diameters is within the mean value ±1 μm, or desirably, the mean value is in a range of 5 μm to 7 μm, and the variation is within the mean value ±0.5 μm.

An eighth aspect of the invention is directed to the hollow disk rotor according to the first aspect of the invention, in which the matrix material is one material selected from among, as thermosetting resin, epoxy resin, unsaturated polyester resin, vinyl ester resin, and phenolic resin; or, as thermoplastic resin, polyolefin-based resin, polyamide-based resin, and polycarbonate-based resin.

A ninth aspect of the invention is directed to the hollow disk rotor according to the first aspect of the invention, in which the carbon nanotubes are single-layer carbon nanotubes with a diameter of 0.5 to 3 nm, multi-layer carbon nanotubes with a diameter of 5 to 30 nm, or carbon nanotubes including both the single-layer carbon nanotubes and the multi-layer carbon nanotubes in a mixed manner.

A tenth aspect of the invention is directed to the hollow disk rotor according to the ninth aspect of the invention, in which a concentration c, in weight %, of the carbon nanotubes in the matrix material is in a range of c=0.1 wt % to 8 wt %.

An eleventh aspect of the invention is directed to a method for manufacturing the hollow disk rotor according to claim 1, including a first step of fixing or bonding carbon nanotubes to the reinforcement fibers; a second step of gathering the reinforcement fibers attached with the carbon nanotubes formed in the first step into a bundle as a reinforcement fiber bundle; and a third step of forming a rotor with the reinforcement fiber bundle formed in the second step and matrix resin using a filament winding method.

BRIEF DESCRIPTION OF DRAWINGS

FIG. 3A and FIG. 3B are explanatory views illustrating an aspect of carbon nanotubes that extend through a matrix material from the surfaces of reinforcement fibers.

FIG. 5 is a table illustrating the rotational performance of a hollow disk rotor according to a first example.

FIG. 7 is a table illustrating the rotational performance of the flywheel according to the second example.

DESCRIPTION OF EMBODIMENTS

Hereinafter, the present invention will be described in detail with reference to the drawings as appropriate. Note that in each drawing, the relationship between a thickness and a dimension in a plan view; the proportion of thicknesses of respective layers; the thickness, the length, and the density of each reinforcement fiber (F) and each carbon nanotube (CNT); and the like are drawn in an exaggerated way or a deformed way. In addition, identical members are assigned an identical reference sign, and repeated description will be omitted. The following description is based on the assumption that the cross-sectional shape of each reinforcement fiber is a common perfect circle (or an almost perfect circle). However, the cross-sectional shape is not limited to a perfect circle.

Figure 1A:
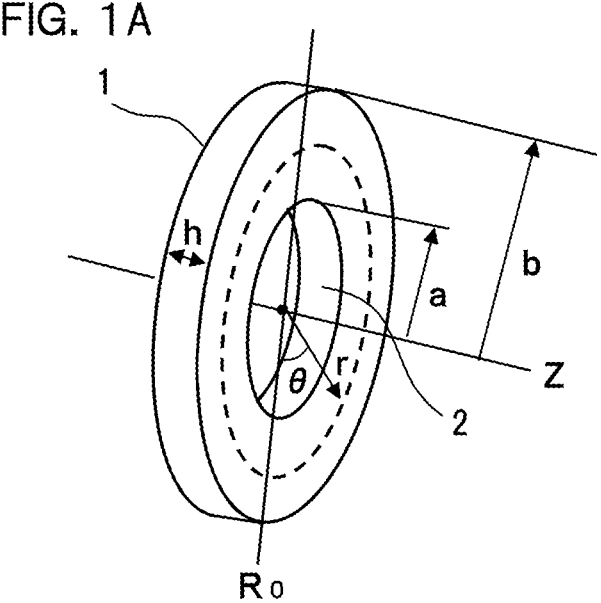
FIG. 1A, FIG. 1B, and FIG. 1C are explanatory views illustrating a hollow disk rotor of the present invention.
Figure 1B:
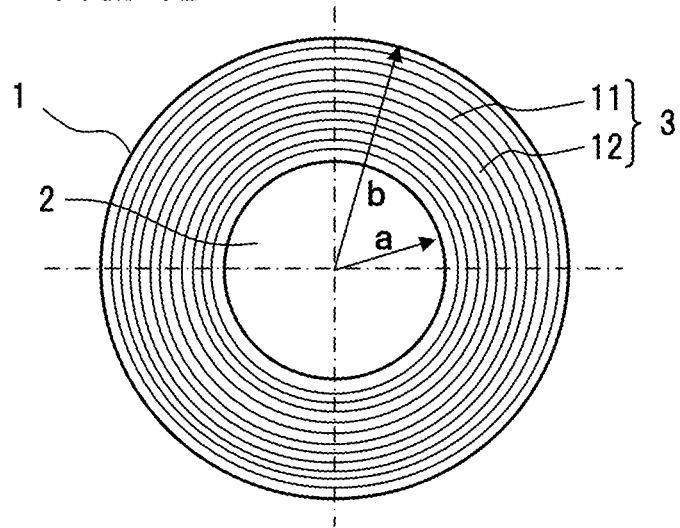
Figure 1C:
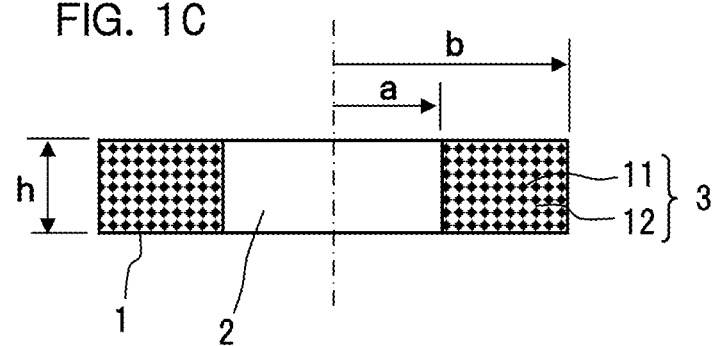

FIG. 1 is an enlarged view of a hollow disk rotor (hereinafter referred to as a CNT-FRP rotor, or simply as a rotor) 1, which is made of plastic reinforced with carbon nanotubes in the radial direction and reinforced with fibers in the circumferential direction, of a flywheel for a flywheel energy storage system according to the present invention. Specifically, FIG. 1A is a perspective view of the rotor 1, FIG. 1B is a cross-sectional view of the rotor 1 along a given rθ plane, and FIG. 1C is a cross-sectional view of the rotor 1 along the Z-axis. For purposes of illustration, the rotor 1 is placed such that its rotating shaft coincides with the Z-axis of the well-known rθZ cylindrical coordinate system.

Reference numeral 2 denotes the central hole (with an outside diameter a) of the rotor 1. Reference signs b, a, and h respectively denote the outer radius, the inner radius, and the length (i.e., height) of the rotor 1. Reference sign r in the drawing denotes the radius as a variable that indicates a given position of the rotor 1.

As illustrated in FIG. 1C and FIG. 3, the material structure of the rotor 1 of the present invention is basically CNT-FRP (reference numeral 3) obtained by reinforcing a matrix material (i.e., plastic) with carbon nanotubes and reinforcement fibers. The rotor 1 includes reinforcement fibers (Fs) 11 that are circumferentially wound in layers, a matrix material 12 that fills the gaps between the reinforcement fibers, and carbon nanotubes (CNTs) 13 extending upward through the matrix material 12 from the surfaces of the reinforcement fibers as the base points.

Typical examples of the reinforcement fibers 11 include carbon fibers (CFs) with high tensile strength. Besides, boron fibers, glass fibers, aramid fibers, alumina fibers, silicon carbide fibers, or various metal fibers may be used in accordance with the intended use. The mean value of the diameters of the reinforcement fibers 11 of the present invention is in the range of at least 3 μm to 9 μm, and variation thereof is within the mean value ±1 μm. More desirably, the mean value is in the range of 5 μm to 7 μm, and the variation is within the mean value ±0.5 μm. If the diameter of each reinforcement fiber 11 is greater than 9 μm, desired tensile strength cannot be obtained. Meanwhile, if the diameter is less than 3 μm, the productivity of the reinforcement fibers would significantly decrease. The following description is based on the assumption that the reinforcement fibers (Fs) 11 are carbon fibers (CFs) with a mean diameter of 6 μm.

Figure 2A:
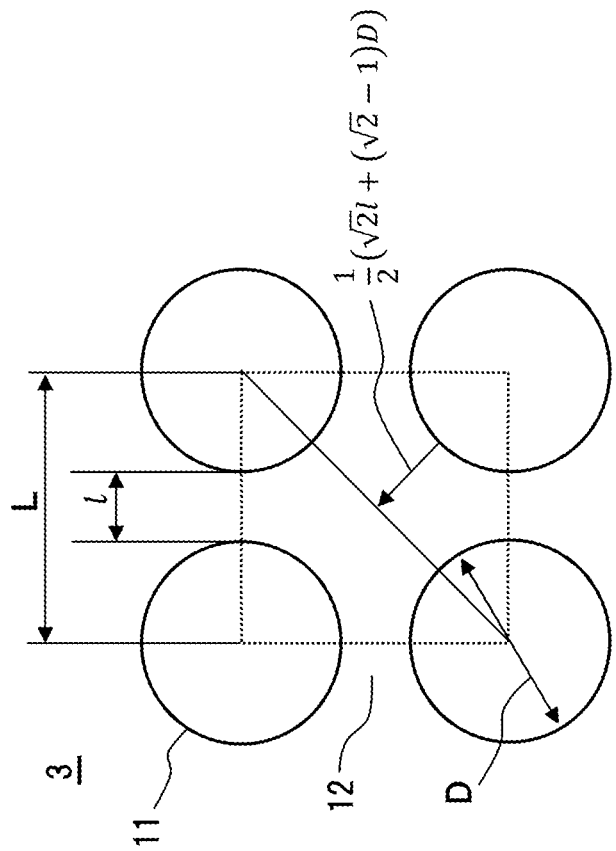
FIG. 2A and FIG. 2B are explanatory views illustrating the positional relationship of reinforcement fibers of the hollow disk rotor of the present invention.
Figure 2B:
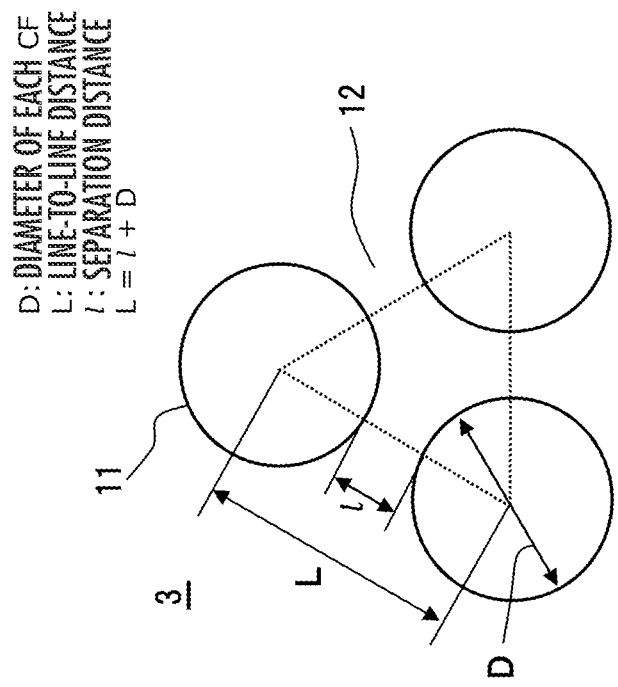

FIG. 2 is a further enlarged image view of FIG. 1C depicting the cross-section. Specifically, FIG. 2 illustrates the two possible positional relationships of the nearest neighbor reinforcement fibers 11, that is, a 6-fold symmetric arrangement (FIG. 2A) and a 4-fold symmetric arrangement (FIG. 2B). In the drawing, reference sign D denotes the diameter of each reinforcement fiber 11, reference sign l denotes the distance between the surfaces of a nearest neighbor pair of reinforcement fibers=the mean separation distance, and reference sign L denotes the distance between the centers of the pair of reinforcement fibers=the mean line-to-line distance. The relationship of L=1+D is satisfied. Reference numeral 12 denotes the matrix material. Note that the CNTs 13 are not depicted in FIG. 1 or 2 for convenience sake.

Needless to say, to respond to the demand for increasing the circumferential yield strength of the CNT-FRP rotor 1 of the present invention, the mean volume fraction $V_F$ of the reinforcement fibers of the rotor is preferably high. From such a point of view, it is desirable that the mean volume fraction $V_F$ be specifically at least 0.5, or preferably, greater than or equal to 0.6.

Hereinafter, the relationship among $V_F$, the diameter D, and the separation distance l of the reinforcement fibers when the reinforcement fibers include both the 6-fold symmetric arrangement (FIG. 2A) and the 4-fold symmetric arrangement (FIG. 2B) in a mixed manner will be described. The volume fraction $V_{FH}$ of the 6-fold symmetric arrangement is represented as follows from the geometric relationship in FIG. 2A.

[Math. 5]

$$V_{FH} = \frac{\pi}{2\sqrt{3}} \frac{D^2}{(l+D)^2} \tag{1a}$$

Similarly, the volume fraction $V_{FT}$ of the 4-fold symmetric arrangement is represented as follows with reference to FIG. 2B.

[Math. 6]

$$V_{FT} = \frac{\pi}{4} \frac{D^2}{(l+D)^2} \tag{1b}$$

Provided that the rotor 1 includes about the same proportions of the reinforcement fibers of the 6-fold symmetric arrangement and the reinforcement fibers of the 4-fold symmetric arrangement, the mean volume occupancy rate $V_F$ is as follows.

[Math. 7]

$$V_F = \frac{1}{2}(V_{FH} + V_{FT}) = 0.85 \times \frac{D^2}{(l+D)^2} \tag{1}$$

Once $V_F$ and D are determined as the specifications of the rotor 1, the separation distance l is determined from the expression (1).

If the rotor 1 includes the reinforcement fibers of the 6-fold symmetric arrangement and the reinforcement fibers of the 4-fold symmetric arrangement at a proportion of m:n, the following expression is used instead of Expression (1).

[Math. 8]

$$V_F = \frac{1}{m+n}(mV_{FH} + nV_{FT}) = \frac{1}{m+n}\left(\frac{m\pi}{2\sqrt{3}} + \frac{n\pi}{4}\right) \times \frac{D^2}{(l+D)^2} \tag{1'}$$

The matrix material 12 is thermoset epoxy resin, for example. Besides, thermosetting resin, such as unsaturated polyester resin, vinyl ester resin, or phenolic resin; or thermoplastic resin, such as polyolefin-based resin, polyamide-based resin, or polycarbonate-based resin, may be used. The following description is based on the assumption that the matrix material 12 is epoxy resin.

A carbon nanotube (CNT) is a reinforcement material with tensile strength as high as 50 to 70 GPa in the direction of the growth axis as is well known. The CNTs 13 applied to the CNT-FRP rotor 1 of the present invention are single-layer CNTs with a diameter of 0.5 to 3 nm, multi-layer CNTs with a diameter of 5 to 30 nm, or CNTs including both the single-layer CNTs and the multi-layer CNTs in a mixed manner.

As illustrated in FIG. 3, each CNT 13 of the rotor 1 of the present invention is connected to the surface of each reinforcement fiber 11 such that "one bottom surface thereof is fixed to the surface of each reinforcement fiber 11" or "the side surface thereof is bonded to the surface of each reinforcement fiber 11 at one point", and the CNT 13 extends (i.e., extends such that it fans out) through the matrix material above it from the connecting point as the base point. Reference sign T in the drawing denotes the mean extension distance of the CNTs. A region 14 is an effective extension region of the CNT. The effective extension region 14 refers to a region of a space from the surface of the reinforcement fiber 11 across the extension distance T of the CNT.

The concentration c, in weight %, of the CNTs 13 extending through the matrix material and contained in the matrix material is in the range of c=0.1 wt % to 8 wt %. If the concentration c is lower than 0.1 wt %, the effective matrix reinforcement effect in the radial direction cannot be obtained in many cases. If the concentration c is higher than 8 wt %, it would be difficult for the surfaces of the reinforcement fibers to be impregnated with the matrix material, which practically makes the production difficult. To reduce the excess consumption of the CNTs, which are relatively expensive materials, the minimum concentration of the CNTs that satisfies the desired radial tensile yield strength (of the rotor 1) is selected from the foregoing concentration range.

The extension distance T of the CNTs refers to the mean height of the ends (i.e., the free bottom surfaces) of the extending CNTs 13 as measured from the surface of each reinforcement fiber 11. In the rotor 1 of the present invention, T needs to satisfy at least the following.

[Math. 9]

$$T \geq \frac{l}{2} \tag{2}$$

However, T desirably satisfies the following unless there is a particular reason:

[Math. 10]

$$T > \frac{1}{2}((\sqrt{2} - 1)D + \sqrt{2}\,l) \tag{2'}$$

Reference sign l in the foregoing expressions denotes the separation distance between the reinforcement fibers, and reference sign D denotes the diameter of each reinforcement fiber. The right-hand side of Expression (2') corresponds to the length of a straight line connecting the intermediate point between a pair of carbon fibers located at the diagonal positions (=second nearest neighbor positions) of the 4-fold symmetric arrangement (FIG. 2B) and the surface of a carbon fiber.

To "fix" the CNTs 13 to the surfaces of the reinforcement fibers 11, "graftage (FIG. 3A)" disclosed in Japanese Patent Laid-Open No. 2018-12741, for example, can be used. The graftage includes the process of covering the surfaces of the reinforcement fibers (CFs) with ultrafine granular catalytic metal (e.g., Ni) to grow CNTs thereon through chemical vapor deposition (CVD), for example. Then, the CNTs with bottom surfaces fixed to the surfaces of the CFs grow in the vertical direction. Since the CNTs grow vertically from the surfaces of the CFs, the mean length u of the CNTs 13 is substantially equal to the extension distance T of the CNTs as follows.

[Math. 11]
$$u = T \quad (3)$$

Meanwhile, to partially "bond" the side surfaces of the CNTs 13 to the surfaces of the reinforcement fibers 11, a "point fixation method (FIG. 3B)" disclosed in Japanese Patent Laid-Open No. 2019-60050, for example, can be used. The method includes the process of attaching the CNTs with the mean length u to the surfaces of the reinforcement fibers (CFs) in a tangled manner, and impregnating them with an emulsion-type sizing agent, which contains an adhesive (e.g., an epoxy adhesive) in a dispersed manner, to perform sizing treatment, and then putting an adhesive 15 in a droplet form thereon, followed by solidification, thereby point-bonding the side surfaces of the CNTs to the surfaces of the reinforcement fibers. According to such a document, the minimum droplet size of the adhesive is 0.05 µm. The CNTs bonded with this method are bent at their bonded points as the base points, and then extend through the matrix material. Thus, to obtain the desired mean extension distance T of the CNTs, the mean length u of the CNTs needs to be set twice the length T. Such a relationship is represented by the following expression.

[Math. 12]
$$u = 2T \quad (3')$$

The parameters, such as the extension distance T, the mean length u, and the concentration c, related to the CNTs 13 are determined through the following procedures, for example. First, it is assumed that the type of reinforcement fibers to be used and the volume fraction $V_F$ thereof are determined as the basic requirements for the CNT-FRP rotor 1. Then, the mean diameter D of the reinforcement fibers is determined. Thus, the separation distance l between the reinforcement fibers is determined from Relational Expression (1) using $V_F$ and D. Once l is determined, the extension distance T of the CNTs is determined from Conditional Expression (2) or (2'). Once T is determined, the desirable mean length u of the CNTs is determined from Relational Expression (3) or (3').

Next, a method for manufacturing the CNT-FRP rotor 1 will be described. First of all, reinforcement fibers having CNTs with the mean length u determined as above are manufactured using the graftage or the point fixation method. The thus manufactured reinforcement fibers are gathered into a tow (i.e., a bundle), and then, the tow is wound in layers with a predetermined matrix material (e.g., thermoset epoxy resin) using a filament winding method. After that, the matrix material is heated to solidify, and is then shaped as needed to complete the rotor 1. To obtain the desired $V_F$, the formation conditions of the filament winding, such as the tension of the tow, are adjusted.

In addition, to obtain the desired radial yield strength, the concentration c of the CNTs is adjusted. It is also possible to adjust the mean length u of the CNTs instead of adjusting the concentration c of the CNTs. Alternatively, both the concentration c of the CNTs and the mean length u of the CNTs can be adjusted.

Note that the relationship between the concentration c of the CNTs and the radial yield strength depends on the filament winding conditions and the matrix material. Thus, readjustment is necessary when the filament winding conditions and the matrix material are changed.

Next, the advantageous effects of the present invention and a mechanism with which such effects are produced will be described with reference to FIG. 4 as a schematic view.

Figure 4A:
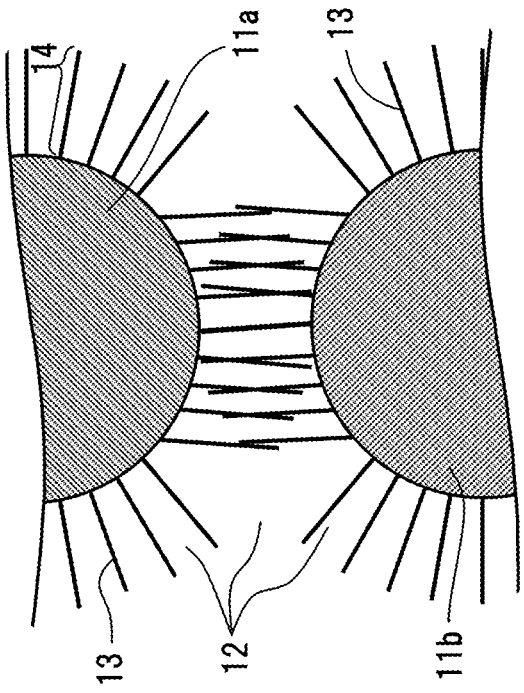
FIG. 4A and FIG. 4B are explanatory views illustrating a state in which carbon nanotubes on the surfaces of a pair of reinforcement monofilaments, which have approached each other, are reconfigured.
Figure 4B:
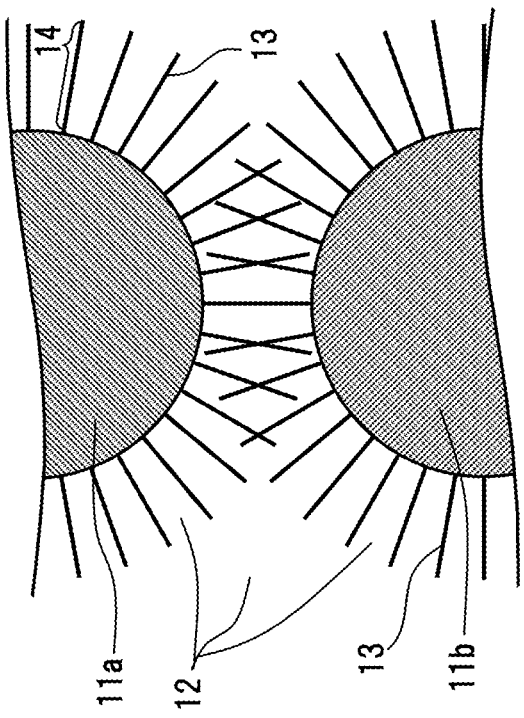

When a given nearest neighbor pair of reinforcement fibers (CFs) 11a and 11b, each having the CNTs 13 extending through the uncured matrix material 12, have approached each other such that their effective extension regions T overlap (FIG. 4A: Conditional Expression (1) above), reconfiguration occurs in the directions in which the CNTs 13 extend as illustrated in FIG. 4B. When the matrix material 12 cures in such a state, a structure is formed in which the matrix portion between the two reinforcement fibers is continuously reinforced with the CNTs 13.

The reinforcement direction of the CNTs 13 is the direction perpendicular to the direction in which the reinforcement fiber extends (i.e., the circumferential direction of the rotor), and is also the direction toward the opposed reinforcement fiber (i.e., the rZ direction of the rotor). Such a reinforcement phenomenon occurs at a time for all nearest neighbor pairs of reinforcement fibers. The level of the reinforcement becomes higher as the separation distance l is shorter and as the concentration of the CNTs is higher. Changing the separation distance l also influences the circumferential yield strength via the volume fraction $V_F$ of the reinforcement fibers. Thus, the reinforcement in the rZ direction is typically adjusted by adjusting the concentration of the CNTs.

As described above, the CNT-FRP rotor 1 of the present invention is a rotor reinforced with the fibers (CFs) in the circumferential direction, and reinforced with the carbon nanotubes (CNTs) in the radial (r) direction and in the direction of the rotating shaft (Z).

Accordingly, as the CNT-FRP rotor 1 of the present invention is also reinforced in the radial direction with a large number of CNTs 13 extending from the surfaces of the reinforcement fibers 11 as the base points, it is possible to reduce or eliminate the drawback of the conventional simple circumferentially wound FRP rotor that its radial yield strength is weak. Further, since the flywheel FRP rotor 1 of the present invention is manufactured using the circumferential winding method (i.e., the filament winding method), it is possible to overcome the drawback of the conventional 3D fabric FRP rotor that precise rotational balance characteristics cannot be obtained. Therefore, it is possible to solve the problem that "neither an expected high peripheral speed limit nor an expected high stored energy limit has been achieved" with the conventional two types of FRP rotors.

First Example

A hollow disk reinforced with circumferentially wound carbon fibers having CNTs added thereto (CNT-CFRP) was formed based on the specifications and the manufacturing method described above. Then, tensile test samples were cut out of the disk in the circumferential direction and the radial direction. The mean volume occupancy rate of each CNT-CFRP sample was $V_F=0.7$, and the mean separation distance between the carbon fibers was $l=0.61$ μm. The carbon fibers used were T1000G (manufactured by Toray Industries, Inc., the mean radius D=6 μm), and the matrix material used was epoxy resin 470-36S (Ashland Inc.), and further, the carbon nanotubes used were multi-layer CNTs with a diameter of 5 to 20 nm. The extension distance of the CNTs was determined as $T=2$ μm in accordance with Conditional Expression (2), and the mean length u of the CNTs was adjusted to $u=3$ μm for the sample with the graftage configuration and to $u=6$ μm for the sample with the point fixation configuration, taking Relational Expressions (3) and (3') into consideration.

Regarding a reference sample (i.e., first conventional technology) without CNTs added thereto, the tensile yield strength σ was $\sigma_{\theta y}=4.5$ GPa in the circumferential direction, and was $\sigma_{ry}=78$ MPa in the radial direction. In contrast, regarding the CNT-CFRP sample according to the present invention, it was recognized that the radial yield strength $\sigma_{ry}$ tends to significantly increase with an increase in the concentration c of the CNTs. Specifically, it was found that the radial yield strength is over $\sigma_{ry}=780$ MPa at c=1.2 wt % for the sample with the graftage configuration, and at c=2 wt % for the sample with the point fixation configuration. Meanwhile, the radial yield strength $\sigma_{\theta y}$ slightly increased, but it was found to be almost at the same level as compared to the increase in $\sigma_{ry}$.

Rotational stress characteristics were theoretically calculated for the hollow disk CNT-CFRP rotor (FIG. 1) with a radial yield strength $\sigma_{ry}=780$ MPa and a circumferential yield strength $\sigma_{\theta y}=4.5$ GPa, and for the conventional simple circumferentially wound CFRP rotor with a radial yield strength $\sigma_{ry}=78$ MPa and a circumferential yield strength $\sigma_{\theta y}=4.5$ GPa, based on the results of the tensile tests. The outer radius of each rotor was set to $b=0.15$ m, the inner radius was set to $a=0.03$ m, and the length was set to $h=1$ m. Common parameters of the physical properties of CFRP were used for the calculation as follows. Specifically, the parameters used were the Young's modulus $E_\theta=2.07\times10^{11}$ Pa and $E_r=1.80\times10^{10}$ Pa, the Poisson's ratio: $v_\theta=0.246$, and the density: $\rho=1650$ kg/m$^3$. Note that the subscript r or θ added to each parameter symbol indicates the direction on the cylindrical coordinates.

FIG. 5 is a table illustrating the results of comparison between the rotational performance of the CNT-CFRP rotor 1 that is the hollow disk rotor of the present invention and the rotational performance of the conventional simple circumferentially wound CFRP rotor (i.e., first conventional technology).

As illustrated in FIG. 5, regarding the CNT-CFRP rotor 1 that is the hollow disk rotor of the present invention, the circumferential velocity limit was 2200 m/s, the rotational speed limit was 141000 rpm, the stored energy limit was 40 kWh, the density of the mass stored energy at the limit level was 355 Wh/kg, and the breaking mode was a circumferential yield. In addition, regarding the CNT-CFRP rotor 1 of the present invention, it is obvious that the circumferential velocity limit and the stored energy limit are respectively about 3 times and about 9 times compared to those of the conventional simple circumferentially wound CFRP rotor (i.e., first conventional technology) that breaks down with a radial yield. Though not illustrated, the CNT-CFRP rotor 1 can be similarly confirmed to have an improved circumferential velocity limit and an improved stored energy limit even in comparison with the 3D fabric CFRP rotor (i.e., second conventional technology) that breaks down due to shaft vibration.

Second Example

Figure 6A:
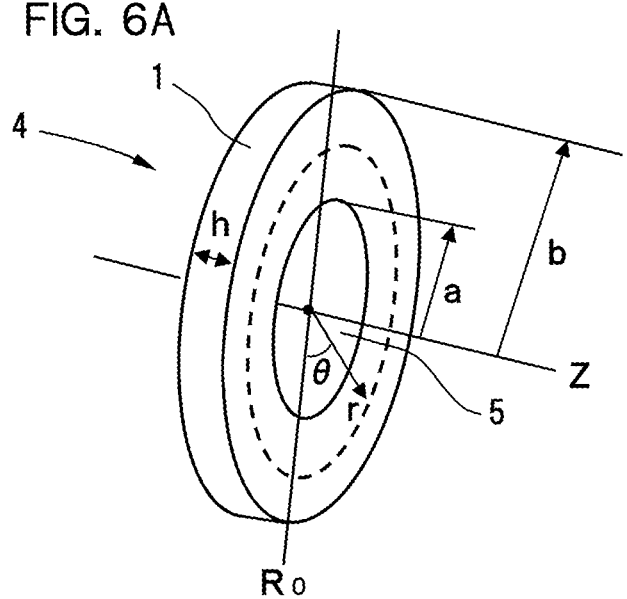
FIG. 6A, FIG. 6B, and FIG. 6C are explanatory views illustrating the configuration of a flywheel according to a second example.
Figure 6B:
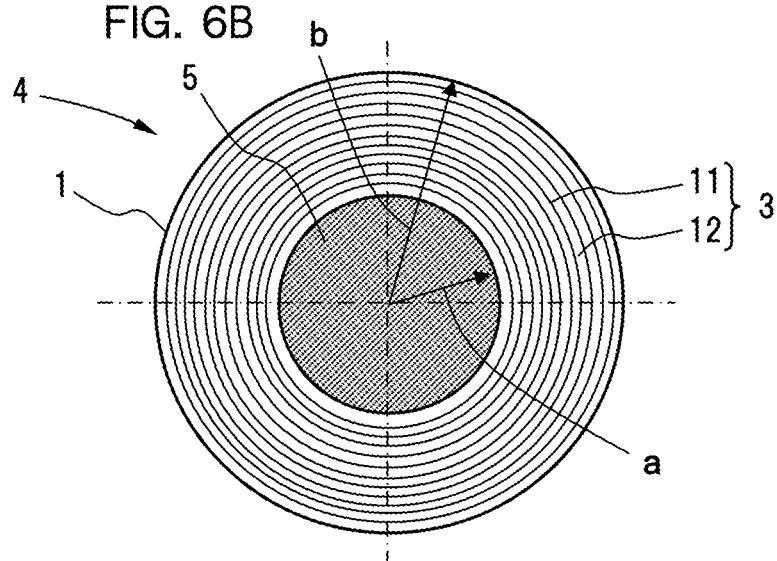
Figure 6C:
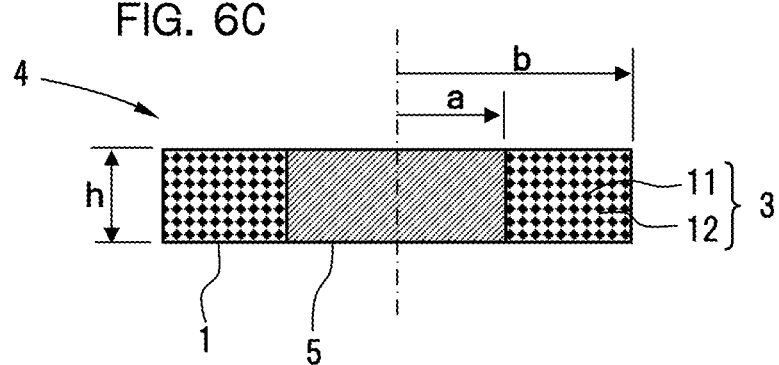

A second example according to the present invention is an example in which a flywheel 4 of a flywheel energy storage system such as the one illustrated in FIG. 6 is constructed with the CNT-CFRP rotor 1 of the first example (FIG. 5). In the drawing, reference numeral 1 denotes the hollow disk CNT-CFRP rotor of the first example, and reference numeral 5 denotes a hub integrally formed with a rotating shaft (not illustrated). The hub 5 has a radius of 0.03 m and a height of 1 m, and the rotating shaft has a radius of 0.015 m. The material of the hub and the rotating shaft is an aluminum alloy A7075P (extra super duralumin).

The parameters of the physical properties of A7075P are such that the Young's modulus: $E_\theta=E_r=7.2\times10^{10}$ Pa, the Poisson's ratio: $v_\theta=0.3$, and the density: $\rho=2800$ kg/m$^3$. The tensile yield strength is $\sigma_{ry}=\sigma_{\theta y}=5.1\times10^8$ Pa.

A table in FIG. 7 illustrates the results of the execution of theoretical calculation. The rotational speed limit of the hub made of extra super duralumin A7075P with a radius of 0.03 m is 210000 rpm. Thus, the rotational speed limit of the flywheel 4 is determined by not the rotational speed limit of the hub 5 but the rotational speed limit of the CNT-CFRP rotor 1, and the value is 141000 rpm as described above. Regarding the hub 5 (with a length of h=1 m) that rotates at 141000 rpm, the rotational energy and the mass are respectively determined as 108 Wh and 7.9 kg based on the physical properties of A7075P.

As illustrated in FIG. 7, the flywheel 4 has a circumferential velocity limit of 2200 m/s, a stored energy limit of 39.9 kWh, and a density of the mass energy at the limit level of 332 Wh/kg. In addition, regarding the flywheel 4 formed using the CNT-CFRP rotor 1 of the present invention, it can be confirmed that the circumferential velocity limit and the stored energy limit are improved in comparison with those of the flywheel formed using the conventional simple circumferentially wound CFRP rotor (i.e., first conventional technology) that breaks down with a radial yield.

INDUSTRIAL APPLICABILITY

The present invention can be suitably used for a flywheel energy storage system, and can significantly improve the circumferential velocity limit and the stored energy limit of a hollow disk (including cylindrical) rotor, which is the main component of a flywheel, in particular, a "hollow disk rotor reinforced with circumferentially wound fibers".

REFERENCE SIGNS LIST

1 CNT-CFRP rotor (i.e., hollow disk rotor)
2 hole of rotor
3 CNT-(C)FRP
4 flywheel having CNT-(C)FRP rotor
5 hub
11 reinforcement fiber (CF)
12 matrix material
13 CNT
14 effective extension region of CNT
15 adhesive in droplet form
b outer radius of FW rotor
a inner radius of FW rotor h length of FW rotor
r radius of rotor (i.e., variable)
θ azimuth angle (i.e., variable)
Z central axis
D diameter of reinforcement fiber
l separation distance between nearest neighbor reinforcement fibers
L distance between center lines of nearest neighbor reinforcement fibers
T effective extension distance of CNT

The invention claimed is:

1. A hollow disk rotor of a flywheel for a flywheel energy storage system, comprising:
a plurality of circumferentially wound reinforcement fibers;
a matrix material that fills gaps between the reinforcement fibers; and
carbon nanotubes extending upward through the matrix material from surfaces of the reinforcement fibers as base points.

2. The hollow disk rotor according to claim 1, wherein provided that a mean separation distance between monofilaments of a pair of nearest neighbor reinforcement fibers is represented by l, and a mean extension distance of the carbon nanotubes extending upward is represented by T, T and l, having the following relationship:

[Math 2]

$$T \geq \frac{l}{2}.$$

3. The hollow disk rotor according to claim 1, wherein each of the base points on the surfaces of the reinforcement fibers has one of a graftage configuration that allows one end surface of each carbon nanotube to be fixed to a respective surface of the surfaces of the reinforcement fibers, or a point fixation configuration that allows a side surface of each carbon nanotube to be bonded to the surface at one point.

4. The hollow disk rotor according to claim 3, wherein a relationship between a mean length dimension u and a mean extension distance T of the carbon nanotubes is as follows for the graftage configuration:

[Math 3]

$$u \geq T,$$

is as follows for the point fixation configuration:

[Math 4]

$$u \geq 2T.$$

5. The hollow disk rotor according to claim 1, wherein a mean volume fraction $V_F$ of the reinforcement fibers is 0.5 (50%) or more.

6. The hollow disk rotor according to claim 5, wherein the mean volume fraction $V_F$ of the reinforcement fibers is 0.6 (60%) or more.

7. The hollow disk rotor according to claim 1, wherein the reinforcement fibers include one type of fiber selected from among carbon fibers, boron fibers, glass fibers, aramid fibers, alumina fibers, silicon carbide fibers, and various metal fibers, or composite fibers including two or more types of the foregoing fibers.

8. The hollow disk rotor according to claim 7, wherein a mean value of diameters of the reinforcement fibers is in a range of 3 μm to 9 μm, and variation of the diameters is within the mean value ±1 μm.

9. The hollow disk rotor according to claim 8, wherein the mean value of diameters of the reinforcement fibers is in a range of 5 μm to 7 μm, and the variation of the diameters is within the mean value ±0.5 μm.

10. The hollow disk rotor according to claim 1, wherein the matrix material is one material selected from among thermoset resin, epoxy resin, unsaturated polyester resin, vinyl ester resin, and phenolic resin; or thermoplastic resin, polyolefin-based resin, polyamide-based resin, and polycarbonate-based resin.

11. The hollow disk rotor according to claim 1, wherein the carbon nanotubes are single-layer carbon nanotubes with a diameter of 0.5 to 3 nm, multi-layer carbon nanotubes with a diameter of 5 to 30 nm, or carbon nanotubes including both the single-layer carbon nanotubes and the multi-layer carbon nanotubes in a mixed manner.

12. The hollow disk rotor according to claim 11, wherein a concentration c, in weight %, of the carbon nanotubes in the matrix material is in a range of c=0.1 wt % to 8 wt %.

13. The hollow disk rotor according to claim 1, wherein provided that a mean separation distance between monofilaments of a pair of nearest neighbor reinforcement fibers is represented by l, a mean diameter of the monofilaments is represented by D, and a mean extension distance of the carbon nanotubes extending upward is represented by T, T, l, and D having the following relationship:

[Math 2]

$$T \geq \frac{1}{2}((\sqrt{2}-1)D + \sqrt{2}\,l).$$

14. A method for manufacturing the hollow disk rotor according to claim 1, comprising:
a first step of fixing or bonding the carbon nanotubes to the reinforcement fibers;
a second step of gathering the reinforcement fibers attached with the carbon nanotubes formed in the first step into a bundle as a reinforcement fiber bundle; and
a third step of forming the hollow disk rotor with the reinforcement fiber bundle formed in the second step and the matrix material using a filament winding method.

* * * * *